(12) United States Patent
Yamada

(10) Patent No.: US 6,839,384 B2
(45) Date of Patent: Jan. 4, 2005

(54) METHOD AND APPARATUS FOR DECODING COMPRESSED VIDEO SIGNALS

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 591 days.

(21) Appl. No.: 10/010,897

(22) Filed: Nov. 13, 2001

(65) Prior Publication Data

US 2002/0057740 A1 May 16, 2002

(30) Foreign Application Priority Data

Nov. 13, 2000 (JP) ........................................ 2000-345059

(51) Int. Cl.[7] .............................................. H04N 7/12
(52) U.S. Cl. ................................................. 375/240.12
(58) Field of Search ....................... 375/240.12, 240.16, 375/240.02, 240.03, 240.2, 240.22; 348/394.1, 402.1, 404.1, 407.1, 413.1, 415.1, 416.1, 426.1, 439.1; 382/232, 236, 238; H04N 7/12

(56) References Cited

U.S. PATENT DOCUMENTS

| | | | | |
|---|---|---|---|---|
| 5,488,419 A | * | 1/1996 | Hui et al. ............... | 375/240.17 |
| 5,978,032 A | * | 11/1999 | Yukitake et al. ....... | 375/240.16 |
| 6,104,753 A | * | 8/2000 | Kim et al. .............. | 375/240.16 |
| 6,192,080 B1 | * | 2/2001 | Sun et al. ............... | 375/240.16 |
| 6,556,627 B2 | * | 4/2003 | Kitamura et al. ...... | 375/240.26 |
| 6,560,282 B2 | * | 5/2003 | Tahara et al. .......... | 375/240.02 |
| 6,658,157 B1 | * | 12/2003 | Satoh et al. ................. | 382/239 |

FOREIGN PATENT DOCUMENTS

| | | |
|---|---|---|
| JP | 9-172594 | 6/1997 |
| JP | 11-136679 | 5/1999 |
| JP | 2000-59793 | 2/2000 |

OTHER PUBLICATIONS

Copy of Japanese Office Action dated Jun. 15, 2004 (and English translation of relevant portion).

M. Iwaski et al., "a Drift Free Scalable Decorder,"Technical Report of the Institute of Electronics, Information and Communication Engineers (IEICE) CS94–186, DSP94–108, pp. 63–70, 1995 (with English language translation of the Abstract).

* cited by examiner

*Primary Examiner*—Nhon Diep
(74) *Attorney, Agent, or Firm*—Dickstein Shapiro, Morin & Oshinsky, LLP.

(57) ABSTRACT

The top field of a coded picture is exclusively decoded. If the decoded field is structured as field picture and the top field of a reference picture is referenced, decoded motion vectors are used to perform a motion compensation. If the nonexistent bottom field of the reference picture is referenced, the decoded motion vectors are corrected so that they extend from the top field of the reference picture to the decoded top field and a motion compensation is performed using the corrected motion vectors. If the decoded field is structured as frame picture and field estimation is used, the same vector correction and motion compensation are repeated, and if frame estimation is used, average values of successive lines of the top field of the reference picture are calculated, the motion vectors are corrected using the average values and a motion compensation is performed using the corrected motion vectors.

9 Claims, 5 Drawing Sheets

METHOD AND APPARATUS FOR DECODING COMPRESSED VIDEO SIGNALS

BACKGROUND OF THE INVENTION

1. Field of the Invention

The present invention relates generally to decoding of compressed video signals, and more specifically to a method and apparatus for decoding video signals such as MPEG-2 video in which video signals are coded according to a compression technique that supports field estimation motion compensation. The present invention is particularly suitable for applications where resolution is reduced for relieving the burden on processing signals.

2. Description of the Related Art

Need often exists for displaying MPEG-2 video signals on a device whose resolution is different from the resolution of the signal. Displaying high-definition television signals on a standard television receiver is a case in point. The usual practice is to first decode the signal and reduce its resolution in a compression process when the signal is displayed. Since fine details (high frequency components) are lost, the use of pre-processing technique is employed to remove high frequency components prior to the decoding process.

Another approach is disclosed in a paper "A Drift Free Scalable Decoder", Masahiro Iwasaki, et al., Technical Report of IEICE (Institute of Electronics, Information and Communication Engineers), CS 94-186, DSP94-108, 1995-01. In this approach, an inverse 4×4 DCT (discrete cosine transform) process is performed on a variable-length decoded, inverse quantized signal to "downscale" its resolution. With this process, the lower frequency components of the signal are exclusively used, with a resultant decrease in the resolution of the signal. The decoded signal then undergoes a motion vector compensation process, which is followed by a process in which motion compensation is performed by halving the motion vectors. However, since the information contained in one of the fields is lost, it is impossible to meet the requirements specified by the MPEG-2 standard only with the use of the field estimation technique.

In order to solve this problem, Japanese Patent Publication P2000-59793A discloses a video decoding technique for both progressive and interlaced video signals. The known technique uses a coding scheme known as the frame DCT mode in which the video signal is encoded by treating its top and bottom fields as a single unit. During decoding, the compressed video is first subjected to an inverse frame-DCT process and then the top and bottom fields are separated from each other. The separated fields are individually subjected to an inverse field-DCT process in which low frequency components are exclusively used to downscale the resolution of the signal. Although much of the field information can be retained, the prior art requires a substantial amount of computations, which would impose a great burden on software-driven systems such as personal computers.

SUMMARY OF THE INVENTION

It is therefore an object of the present invention to provide a method and apparatus for decoding a compressed video signal by downscaling its resolution with reduced computations and high-speed capability.

According to a first aspect of the present invention, there is provided a video decoding method for decoding a coded picture by a reference picture, wherein the coded picture contains first and second fields and the reference picture exclusively contains a first field. The method comprises exclusively decoding the first field of the coded picture whereby the decoded picture contains motion vectors and determining whether the first field of the reference picture or a nonexistent second field of the reference picture is referenced. If the first field of the reference picture is determined to be referenced, a motion compensation is performed by using the motion vectors. If the nonexistent second field of the reference picture is determined to be referenced, the motion vectors are corrected so that they extend from the first field of the reference picture to the decoded first field and a motion compensation is performed by using the corrected motion vectors.

According to a second aspect, the present invention provides a video decoding method for decoding a coded picture by using a reference picture, wherein the coded picture contains first and second fields and the reference picture exclusively contains a first field, the method comprising exclusively decoding the first field of the coded picture whereby the decoded picture contains motion vectors and determining whether field estimation or frame estimation is to be used for motion compensation. If the field estimation is determined to be used, the first field of the reference picture or a nonexistent second field of the reference picture is determined to be referenced. If the first field of the reference picture is determined to be referenced, a motion compensation is performed by using the motion vectors. If the nonexistent second field of the reference picture is determined to be referenced, the motion vectors are corrected so that they extend from the first field of the reference picture to the decoded first field and a motion compensation is performed by using the corrected motion vectors. If the frame estimation is determined to be used, average values of successive lines of the first field of the reference picture are calculated, and the motion vectors are corrected using the average values and a motion compensation is performed by using the calculated motion vectors.

According to a third aspect of the present invention, there is provided a video decoding method for decoding a coded picture by using a reference picture, wherein the coded picture contains first and second fields and is structured as field picture or frame picture, and the reference picture exclusively contains a first field, the method comprising the steps of (a) exclusively decoding the first field of the coded picture whereby the decoded picture contains motion vectors, (b) determining whether the decoded first field is structured as field picture or as frame picture, (c) if the decoded first field is determined to be structured as field picture, determining whether the first field of the reference picture or a nonexistent second field of the reference picture is referenced, (d) if the first field of the reference picture is determined to be referenced, performing a motion compensation by using the decoded motion vectors, (e) if the nonexistent second field of the reference picture is determined to be referenced, correcting the decoded motion vectors so that they extend from the first field of the reference picture to the decoded first field and performing a motion compensation by using the corrected motion vectors, (f) if the decoded first field is determined to be structured as frame picture, determining whether field estimation or frame estimation is to be used, and (g) if the field estimation is determined to be used, repeating steps (d) and (e), and if the frame estimation is determined to be used, calculating average values of successive lines of the first field of the reference picture, calculating motion vectors using the average values and performing a motion compensation by using the calculated motion vectors.

According to a fourth aspect of the present invention, there is provided an apparatus for decoding a coded picture by using a reference picture, wherein the coded picture contains first and second fields and the reference picture exclusively contains a first field. The apparatus comprises decoding circuitry for exclusively decoding the first field of the coded picture, motion compensation circuitry, and motion vector correction circuitry, and control circuitry. The control circuitry provides the functions of for causing the motion compensation circuitry to perform a motion compensation by using motion vectors decoded by the decoding circuitry if the first field of the reference picture is referenced. Further, the control circuitry causes the motion vector correction circuitry to correct the decoded motion vectors so that they extend from the first field of the reference picture to the decoded first field and causes the motion compensation circuitry to perform a motion compensation by using the corrected motion vectors if the nonexistent second field of the reference picture is referenced.

According to a fifth aspect, the present invention provides an apparatus for decoding a coded picture by using a reference picture, wherein the coded picture contains first and second fields, and the reference picture exclusively contains a first field. The apparatus comprises decoding circuitry for exclusively decoding the first field of the coded picture, motion compensation circuitry, motion vector correction circuitry, averaging circuitry, and control circuitry. The control circuitry performs the functions of causing the motion compensation circuitry to perform a motion compensation by using the decoded motion vectors if the first field of the reference picture is referenced. If the nonexistent second field of the reference picture is referenced, the control circuitry causes the motion vector correction circuitry to correct the decoded motion vectors so that the corrected vectors extend from the first field of the reference picture to the decoded first field and causes the motion compensation circuitry to perform a motion compensation by using the corrected motion vectors. If frame estimation is used, the control circuitry causes the averaging circuitry to calculate average values of successive lines of the first field of the reference picture, causes the motion vector correction circuitry to correct the decoded motion vectors by using the average values and causes the motion compensation circuitry to perform a motion compensation by using the corrected motion vectors.

BRIEF DESCRIPTION OF THE DRAWINGS

The present invention will be described in detail further with reference to the following drawings, in which.

DETAILED DESCRIPTION

Figure 1:
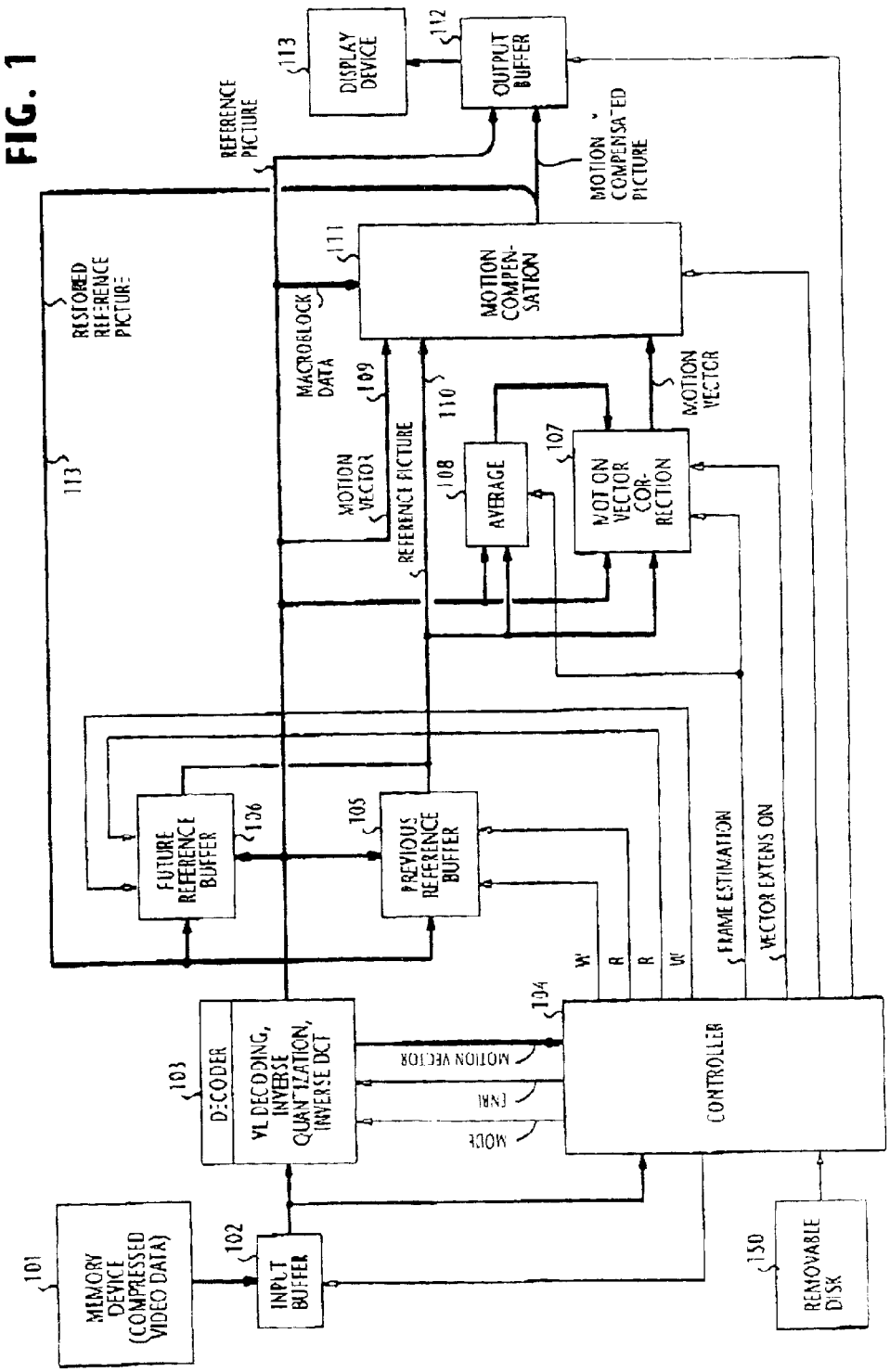
FIG. 1 is a block diagram of a video decoder according to the present invention.

In FIG. 1, a video decoder according to the present invention is illustrated. A compressed video signal encoded according to the MPEG-2 standard is stored in a memory device 101. MPEG-2 video deals with objects that are used to structure video information. A picture is one of the objects defined by the standard. Each picture is divided into a number of blocks of 8×8 pixels each, which are grouped into macroblocks. Four blocks of luminance values plus a number of blocks with chrominance values form a macroblock. Three picture types are defined in MPEG-2 video: Intra-coded pictures (T-pictures), predictive coded pictures (P-pictures) and bidirectionally predicted pictures (B-pictures). The pictures are either coded as "field pictures" to handle interlaced video display modes, or "frame pictures" to handle non-interlaced display modes. Two field pictures always occur in a pair, one containing the top field, the other containing the bottom field of the complete frame. Field pictures are used if they contain motion and not so much detail. Frame pictures, on the other hand, are formed by first combining the top and bottom fields to form a frame, which is then encoded. Frame pictures are used if there is a lot of detail in the picture and only limited motion. A video sequence represents a number of such pictures which occur in a predetermined order. Since the I-picture in a video sequence is encoded in such a way that it can be decoded without knowing anything about other pictures in the video sequence, the first picture in that sequence is an I-picture and serves as a reference picture.

In a video sequence, the P-picture is decoded by using information from the reference picture (I-picture) of the video sequence which was displayed previously. The P-picture contains information that cannot be burrowed from the reference picture. Such information is coded in the same way I-pictures are coded. Therefore, the P-picture contains intra-coded macroblocks (I-macroblocks) which can be used as reference information, and predictive coded macroblocks (P-macroblocks). Two B-pictures occur in each video sequence. Each B-picture uses information from a previous picture and a future picture of the video sequence. As in P-pictures, picture information that cannot be found in previous or future pictures is intra-coded as I-macroblocks.

The signal stored in the input buffer 102 is read on a per-picture basis, for example, into an input buffer 102, wherein it is fed to a decoder 103 and a controller 104 on a per-macroblock basis. Controller 104 is a microprocessor-based controller which reads programmed instruction data from a storage medium 150 such as a removable disk. Decoder 103 is set in one of two decoding modes (frame DCT mode or field DCT mode) according to a command signal from the controller 104 and performs decoding exclusively on top-field lines of the signal when enabled by the controller. The decoding process includes variable length decoding, inverse quantization and inverse 8×8 DCT (discrete cosine transform) decoding. Thus, the controller 104 needs to identify the macroblock whether it is structured as frame picture or as field picture. If the macroblock is identified as a frame picture the decoder 103 is set in the frame DCT mode. Otherwise, the decoder is set in the field DCT mode. Additionally, the decoder 103 supplies decoded motion vectors to the controller 104.

A previous reference buffer 105 and a future reference buffer 106 are connected to the output of the decoder 103 for storing decoded macroblocks to form previous and future reference pictures, respectively, in response to a write command from the controller 104. The output of decoder 103 is further coupled to an output buffer 112 for copying data that can be directly displayed such as I-pictures and I-macroblocks contained in either B-pictures and P-pictures.

The data stored in the reference buffers 105 and 106 are read by the controller 104 when the current macroblock uses information from previous or future picture. As will be described in detail, when the current macroblock is of a frame picture type, the controller 104 requests a motion vector corrector 107 to correct decoded motion vectors by using the outputs of reference buffers 105, 106. During a field estimation mode, the controller 104 commands the motion vector corrector 107 to correct the decoded motion vectors by extending their starting points to the first field for coupling to motion compensation circuitry 111, to which the outputs of decoder 103 and reference buffers 105, 106 are also applied through lines 109 and 110. An averaging circuit 108 is provided to respond to a command signal from the controller 104 for producing an average value of successive lines of the top field of a reference picture to estimate its nonexistent (virtual) bottom field during a frame estimation mode. Further, the averaging circuit 108 produces an average value of successive lines of the top field of the current picture to estimate its nonexistent bottom field during the frame estimation mode. The output of the average circuit 108 is coupled to the motion vector corrector 107 to recalculate motion vectors.

According to a command signal from the controller 104, the motion compensation circuitry 111 selects its input signals on which to perform motion compensation and delivers a restored signal to the output buffer 112.

The data stored in the output buffer 112 will be read into a display device 113 when a complete picture is restored and displayed.

Figure 2:
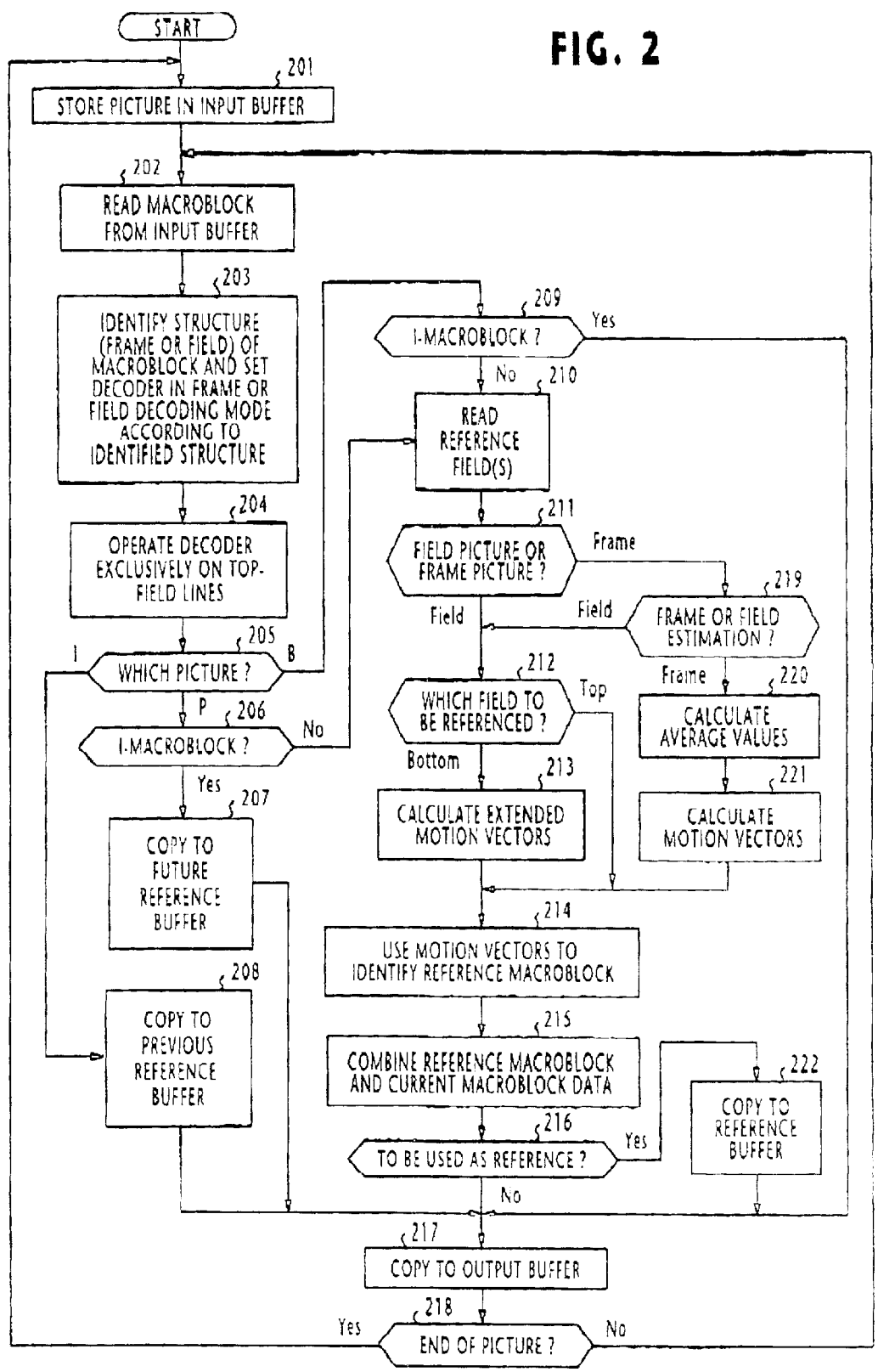
FIG. 2 is a flowchart of the operation of the video decoder.

The operation of the controller 104 along with its associated elements will be understood with the following description of a routine shown in the flowchart of FIG. 2.

The routine begins with step 201 where the controller commands the input buffer 102 to read a picture from the memory device 101. At step 202, a macroblock is read out of the buffer 102 into the decoder 103 and the controller 104. Controller 103 examines the structure of the macroblock and identifies whether it is structured as frame picture or a field picture and sets the decoder 103 in one of the two decoding modes according to the identified structure (step 203) and enables the decoder to proceed decoding on the top-field lines of the macroblock (step 204).

Figure 3:
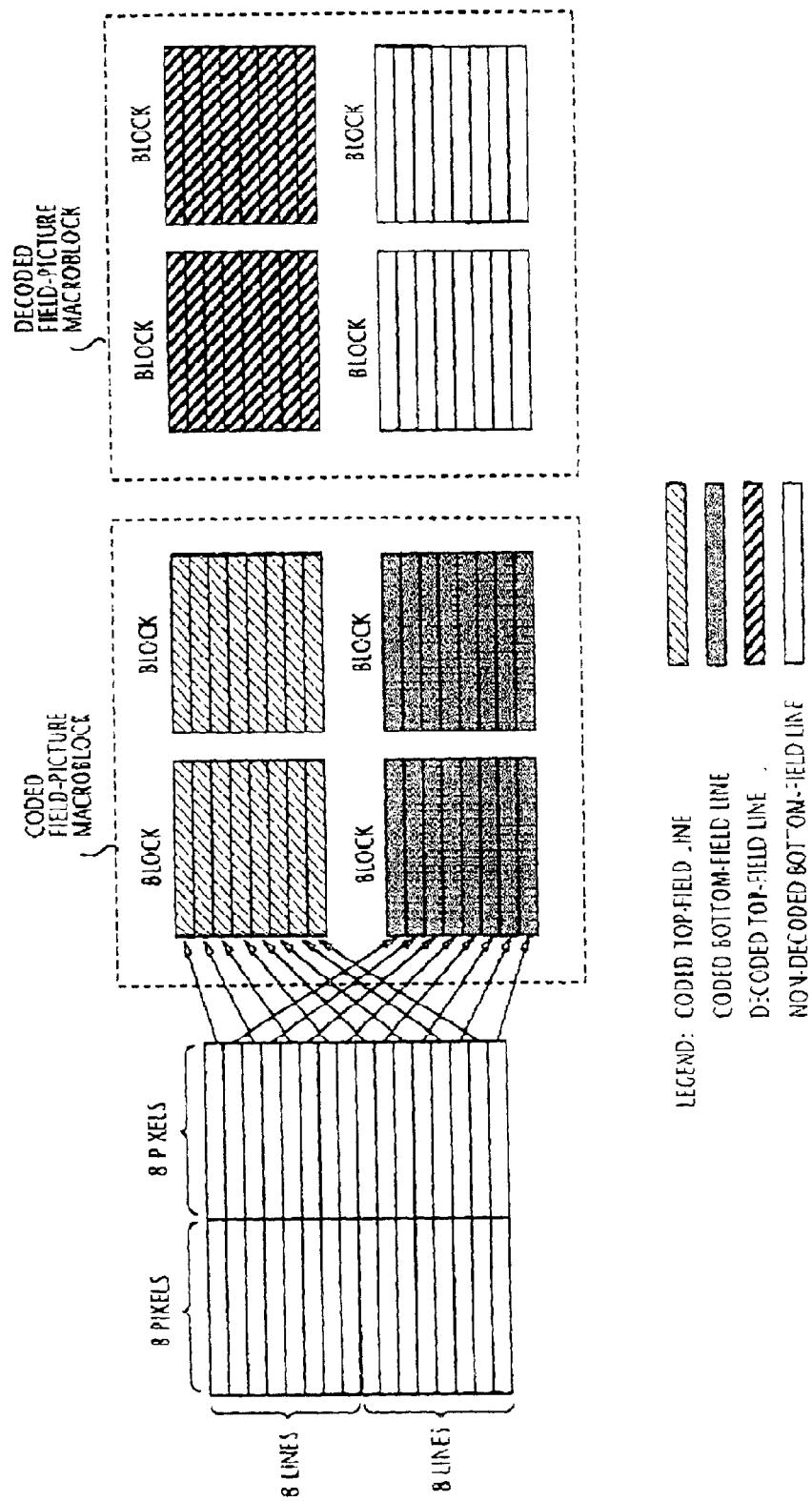
FIG. 3 is an illustration of a macroblock which is structured as field picture and coded in a field DCT mode for storage and then decoded according to the present invention.

A macroblock (16×16 pixels) is formed in field picture as shown in FIG. 3, in which odd-numbered lines are separated from even-numbered lines to form two 8×8 top-field blocks and two 8×8 bottom-field blocks, which are coded prior to storage in the memory device 101. Decoder 103 provides field decoding exclusively on the top-field blocks, leaving the bottom-field blocks entirely non-decoded.

Figure 4:
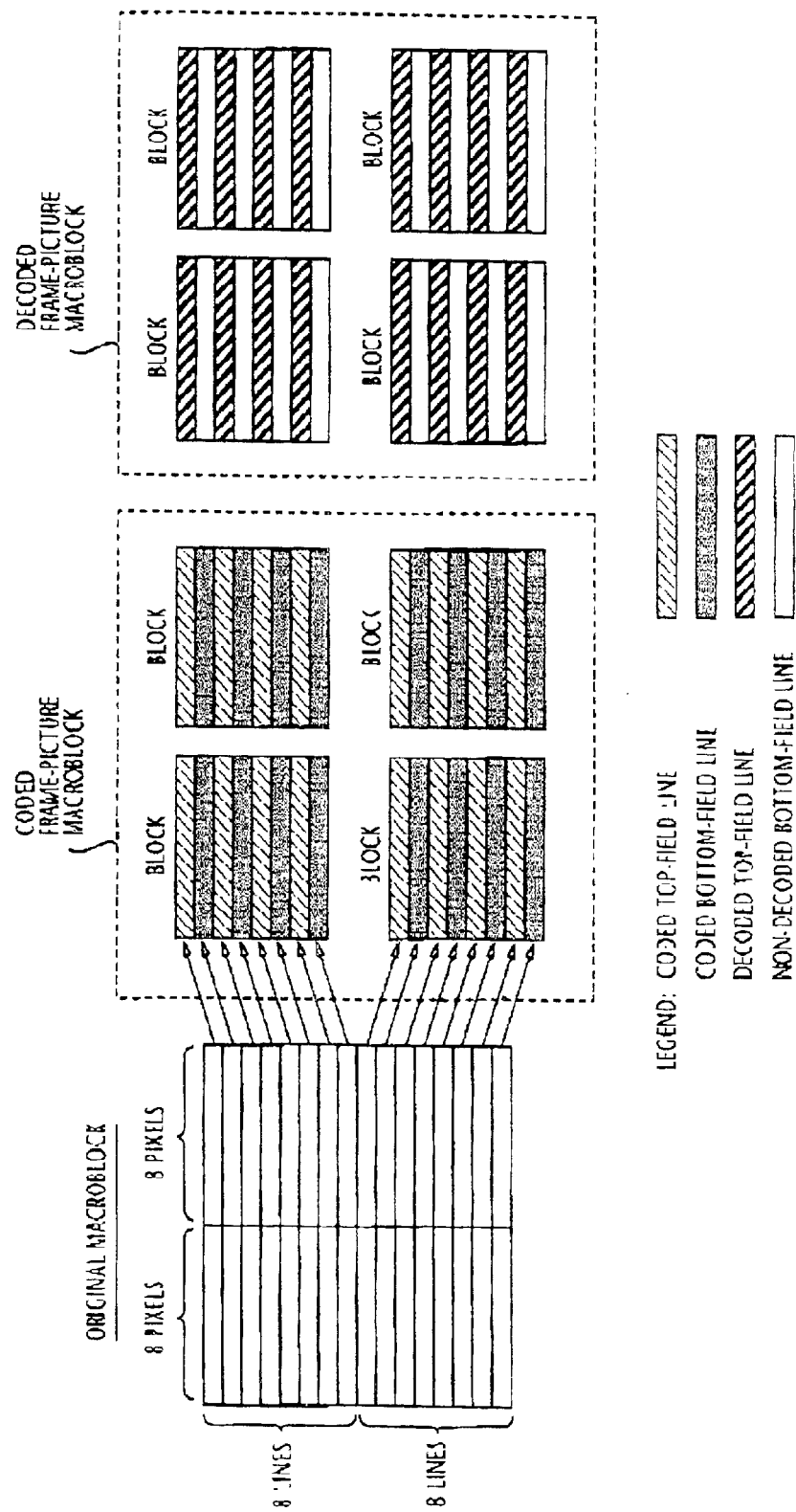
FIG. 4 is an illustration of a macroblock which is structured as frame picture and coded in a frame DCT mode for storage and then decoded according to the present invention.

In a similar way, a macroblock is structured in frame picture as shown in FIG. 4 and coded prior to storage in the memory device 101, and then read from the device 101 and processed by the decoder 108. Odd numbered lines (top-field lines) and even-numbered lines (bottom-field lines) occur at regular intervals and divided into four blocks of 8×8 pixels each. Decoder 103 performs the frame decoding only on the top-field lines, leaving the bottom-field lines non-decoded.

In the coding process, a search made through previous and future pictures for a macroblock that matches or closely matches the current macroblock. If such a macroblock is found, the difference between this macroblock and the current macroblock is determined. The resulting different is the motion vector, which is first DCT coded and then variable length coded together with the motion vector of the macroblock.

The single-field decoding lowers the resolution of the picture but significantly relieves the burden of computations.

At decision step 205, the controller 103 examines the decoded macroblock to identify it as I-picture, B-picture or P-picture. If the macroblock is identified as I-picture, flow proceeds from step 205 to step 208 to copy the macroblock to the previous reference buffer 105, and thence to step 217 to store the copy to the output buffer 112. If the macroblock is identified as B-picture, flow proceeds to step 209 to check to see if it is an I-macroblock of B-picture. If this is the case, the controller branches out to step 217 for storing the copy of the macroblock in the output buffer. If decision step 205 identifies the macroblock as P-picture, flow exits to step 206 to determine if it is an I-macroblock of P-picture. If so, the controller proceeds to step 207 to copy the macroblock to the future reference buffer 106 and further moves to step 217 to store the copy in the output buffer 112.

If the decision is negative at either step 209 or 206, the controller recognizes that it needs some information from reference buffers and then determines which picture or pictures are required based on the transmission order of pictures as specified by the MPEG-2 standard. As a result, the controller reads, at step 210, field data of one or more stored pictures from the buffers 105 and 106 into the motion compensation circuitry 111, depending on whether the current macroblock is B-picture or P-picture.

At step 211, the controller re-examines the structure of the macroblock as it did at step 203. If the current macroblock was identified as field picture, the controller proceeds to decision step 212 to determine which field of the reference picture to be referred to for motion compensation of the current macroblock.

Before proceeding with the description of motion compensation, it is appropriate to discuss the "field estimation" and "frame estimation" currently used in the state-of-the-art. In the field estimation mode, field information is used as a basic unit for individually estimating the motion of a macroblock by referring to either of the top and bottom fields of a reference picture. Therefore, a bottom field of one or more reference pictures may be referred to when a top field is estimated and a top field of one or more reference pictures may be referred to when a bottom field is estimated. In the frame estimation method, a top field is estimated by reference to a top field of one or more reference frames and a bottom field is estimated by reference to a bottom field of one or more reference frames.

If the controller determines, at step 212, that the top-field is to be referenced, flow advances to step 214 to command the motion compensation circuitry 111 to perform a motion compensation using the motion vectors decoded at step 203. More specifically, the motion compensation circuitry uses the decoded motion vectors to identify a macroblock in the retrieved reference field, and combines the identified reference macroblock with the current macroblock data (i.e., the decoded difference) to restore the original macroblock (at step 215).

If the controller determines that the bottom-field lines of the reference picture are to be referenced, flow proceeds from step 212 to step 213. Since the bottom-field data are not decoded in the present invention, the data to be referenced is nonexistent in both of the reference buffers 105 and 106 when the controller proceeds from step 212 to step 213. In this case, the controller directs the motion vector corrector 107 to correct the decoded motion vectors "y" that extend from the virtual bottom field of the reference picture to the current picture by extending their starting points to the top field of the reference picture and calculating the extended vectors.

Figure 5:
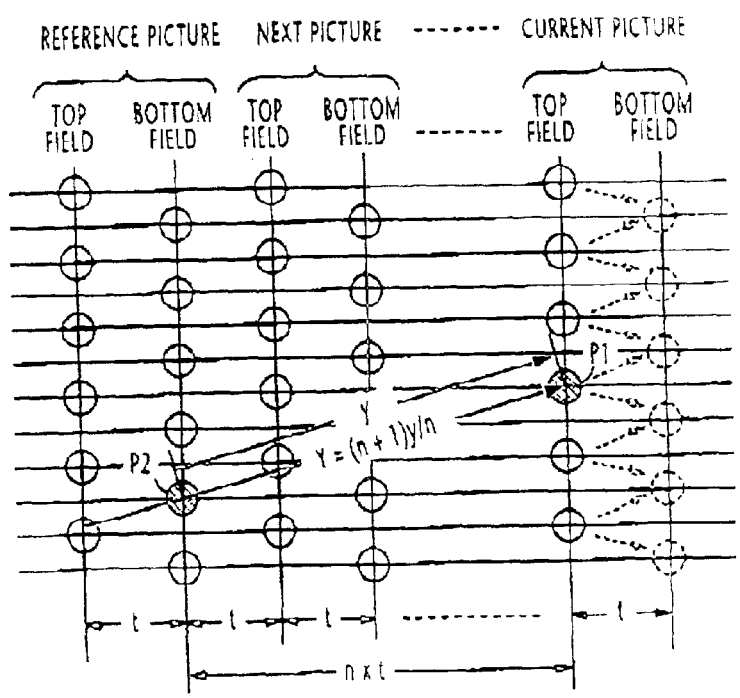
FIG. 5 is an illustration of video lines for extending a motion vector when field estimation is used.

FIG. 5 explains details of the calculation of the extended motion vector performed by step 213. If the time interval between the top and bottom fields of each picture is "t", the time interval between the bottom field of the reference picture and the top field of the next picture is also "t". The reference and current pictures are thus separated from each other by an interval n×t, where n is an integer. In FIG. 5, the decoded motion vector "y" represents the motion of a pixel P1 on the top field of the current picture in the direction of vertical scan (line-by-line) from a virtual (nonexistent) pixel P2 on the bottom field of the reference picture, a vector "Y" represents the motion of the pixel P1 from an extended point of the vector "y" that intersects the top field of the reference picture. The extended motion vector "Y" is calculated as follows:

$$Y=(n+1)(y/n) \qquad (1)$$

if Y is not an integer, an internally divided value of the distance between successive lines is used instead of the non-integral number. Thus, when step 212 determines that the bottom field is to be used as a reference, the controller commands the motion vector corrector 107, at step 213, to calculate Equation (1) to obtain extended motion vectors. The extended motion vectors are used at step 214 to identify a reference macroblock in the reference field and the current macroblock is combined with the reference macroblock at step 215. In addition, if the current macroblock is used as a reference picture, the values of successive lines of the top field of the current macroblock are averaged to construct motion vectors for the virtual bottom field of the current macroblock, as indicated by dotted lines in FIG. 5. In this case, such motion vectors are used by the motion compensation steps 214, 215 to reconstruct the bottom field and stored in one of the reference buffers.

If, at step 211, the current macroblock is identified as frame picture, flow proceeds to step 219 where the controller 104 determines which of two estimation methods (field estimation and frame estimation) to be used for motion compensation, depending on the motion vectors decoded and supplied from the decoder 103 at step 203.

Figure 6:
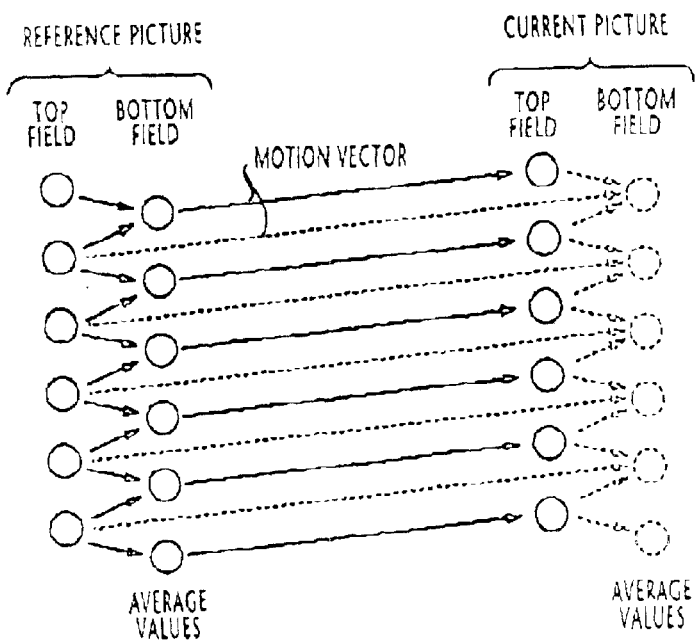
FIG. 6 is an illustration of video lines for yielding average values of top-field lines to substitute for nonexistent bottom field lines when frame estimation is used.

If step 219 determines that the field estimation method is used, the controller proceeds to step 212 to perform the same procedures as it did on the macroblock of field picture. If the frame estimation is to be used for motion compensation, the controller proceeds to step 220 to instruct the average circuit 108 to calculate average values of successive lines of the top field of the reference picture as shown in FIG. 6 and uses the average values as substitutes for the virtual bottom field of the reference picture. Flow proceeds from step 220 to step 221 to calculate motion vectors that extend from the estimated bottom-field pixels of the reference picture to the top field of the current picture. In addition, if the current macroblock is used as a reference picture, the values of successive lines of the top field of the current macroblock are averaged to construct motion vectors for the virtual bottom field of the current macroblock, as indicated by dotted lines in FIG. 6. In this case, such motion vectors are used by the motion compensation steps 214, 215 to reconstruct the bottom field and stored in one of the reference buffers.

Step 221 is followed by step 214, where the calculated motion vectors of step 220 are used to identify a reference macroblock in the reference field to be combined with the current macroblock at step 215.

If the restored macroblock obtained at step 215 is to be used as a reference picture (step 216), a copy of the restored macroblock is supplied from the motion compensation circuitry 111 through line 113 and stored in one of the reference buffers depending on the position of the current picture in the video sequence (step 222) and further stored in the output buffer for display (step 217). If the decision is negative at step 216, the combined data is copied to the output buffer (step 217) and not copied to the reference buffers.

Step 217 is followed by decision step 218, where the current macroblock is checked to see if the end of picture is reached. If not, the controller returns to step 202 to read the next macroblock from the input buffer. If the end of picture is reached, the controller returns to the starting point of the routine to read the next picture from the memory device 101 to the input buffer 102.

What is claimed is:

1. A video decoding method for decoding a coded picture by using at least one reference picture, wherein said coded picture contains first and second fields and said at least one reference picture exclusively contains a first field, the method comprising:
    a) exclusively decoding the first field of the coded picture, whereby the decoded picture contains motion vectors;
    b) determining whether the first field of said reference picture or a nonexistent second field of the reference picture is referenced;
    c) if the first field of said reference picture is determined to be referenced, performing a motion compensation by using said motion vectors; and
    d) if the nonexistent second field of said reference picture is determined to be referenced, correcting said motion vectors so that the corrected motion vectors extend from the first field of said reference picture to said decoded first field and performing a motion compensation by using the corrected motion vectors.

2. A video decoding method for decoding a coded picture by using at least one reference picture, wherein said coded picture contains first and second fields and said at least one reference picture exclusively contains a first field, the method comprising:
    a) exclusively decoding the first field of the coded picture, whereby the decoded picture contains motion vectors;
    b) determining whether field estimation or frame estimation is to be used for motion compensation;
    c) if the field estimation is determined to be used, determining whether the first field of said reference picture or a nonexistent second field of the reference pictures is referenced;
    d) if the first field of said reference picture is determined to be referenced, performing a motion compensation by using said motion vectors;
    e) if the nonexistent second field of said reference picture is determined to be referenced, correcting said motion vectors so that the corrected motion vectors extend from the first field of said reference picture to said decoded first field and performing a motion compensation by using the corrected motion vectors; and
    f) if the frame estimation is determined by step (c) to be used, calculating average values of successive lines of the first field of said reference picture, calculating motion vectors using the average values and performing a motion compensation by using the calculated motion vectors.

3. A video decoding method for decoding a coded picture by using at least one reference picture, wherein said coded picture contains first and second fields and is structured as field picture or frame picture, and said at least one reference picture exclusively contains a first field, the method comprising the steps of:
   a) exclusively decoding the first field of the coded picture, whereby the decoded picture contains motion vectors;
   b) determining whether the decoded first field is structured as field picture or as frame picture;
   c) if the decoded first field is determined to be structured as field picture, determining whether the first field of said reference picture or a nonexistent second field of the reference picture is referenced;
   d) if the first field of said reference picture is determined to be referenced, performing motion compensation on said decoded first field;
   e) if the nonexistent second field of said reference picture is determined to be referenced, correcting said motion vectors so that the corrected motion vectors extend from the first field of said reference picture to said decoded first field and performing a motion compensation by using the corrected motion vectors;
   f) if the decoded first field is determined to be structured as frame picture, determining whether field estimation or frame estimation is to be used; and
   g) if the field estimation is determined to be used, repeating steps (d) and (e), and if the frame estimation is determined to be used, calculating average values of successive lines of the first field of said reference picture, calculating motion vectors using the average values and performing a motion compensation by using the calculated motion vectors.

4. An apparatus for decoding a coded picture by using at least one reference picture, wherein said coded picture contains first and second fields and said at least one reference picture exclusively contains a first field, the apparatus comprising:
   decoding circuitry for exclusively decoding the first field of the coded picture, whereby motion vectors are decoded;
   motion compensation circuitry;
   motion vector correction circuitry; and
   control circuitry for causing said motion compensation circuitry to perform a motion compensation by using the decoded motion vectors if the first field of said reference picture is referenced,
   said control circuitry causing said motion vector correction circuitry to correct said motion vectors so that the corrected vectors extend from the first field of said reference picture to said decoded first field and causing said motion compensation circuitry to perform a motion compensation by using the corrected motion vectors if the nonexistent second field of said reference picture is referenced.

5. An apparatus for decoding a coded picture by using at least one reference picture, wherein said coded picture contains first and second fields, and said at least one reference picture exclusively contains a first field, the apparatus comprising:
   decoding circuitry for exclusively decoding the first field of the coded picture whereby motion vectors are decoded;
   motion compensation circuitry;
   motion vector correction circuitry;
   averaging circuitry; and
   control circuitry for causing said motion compensation circuitry to perform a motion compensation by using the decoded motion vectors if the first field of said reference picture is referenced,
   said control circuitry causing said motion vector correction circuitry to correct said decoded motion vectors so that the corrected vectors extend from the first field of said reference picture to said decoded first field and causing said motion compensation circuitry to perform a motion compensation by using the corrected motion vectors, if the nonexistent second field of said reference picture is determined to be referenced,
   said control circuitry causing said averaging circuitry to calculate average values of successive lines of the first field of said reference picture, causing said motion vector correction circuitry to correct said decoded motion vectors by using the average values and causing said motion compensation circuitry to perform a motion compensation by using the corrected motion vectors, if frame estimation is used.

6. The apparatus of claim 5, wherein said control circuitry causes said averaging circuitry to calculate said average values if the decoded field is structured as frame picture.

7. A computer-readable storage medium containing instruction data for decoding a coded picture by using at least one reference picture, wherein said coded picture contains first and second fields and said at least one reference picture exclusively contains a first field, the instruction data comprising the instructions of:
   a) exclusively decoding the first field of the coded picture, whereby motion vectors are decode;
   b) determining whether the first field of said reference picture or a nonexistent second field of the reference picture is referenced;
   c) if the first field of said reference picture is determined to be referenced, performing motion compensation by using said decoded motion vectors; and
   d) if the nonexistent second field of said reference picture is determined to be referenced, correcting said motion vectors so that the corrected vectors extend from the first field of said reference picture to said decoded first field and performing a motion compensation by using the corrected motion vectors.

8. A computer-readable storage medium containing instruction data for decoding a coded picture by using at least one reference picture, wherein said coded picture contains first and second fields and said at least one reference picture exclusively contains a first field, the instruction data comprising the instructions of:
   a) exclusively decoding the first field of the coded picture, whereby motion vectors are decoded;
   b) determining whether field estimation or frame estimation is to be used for motion compensation;
   c) if the field estimation is determined to be used, determining whether the first field of said reference picture or a nonexistent second field of the reference picture is referenced;
   d) if the first field of said reference picture is determined to be referenced, performing a motion compensation by using the decoded motion vectors;
   e) if the nonexistent second field of said reference picture is determined to be referenced, correcting said decoded motion vectors so that the corrected vectors extend from the first field of said reference picture to said decoded first field and performing a motion compensation by using the corrected motion vectors; and f) if the frame estimation is determined to be used, calculating average values of successive lines of the first field of said reference picture, correcting the decoded motion vectors by using the average values and performing a motion compensation by using the corrected motion vectors.

9. A computer-readable storage medium containing instruction data for decoding a coded picture by using at least one reference picture, wherein said coded picture contains first and second fields and is structured as field picture or frame picture, said at least one reference picture exclusively contains a first field, the instruction data comprising the instructions of:

a) exclusively decoding the first field of the coded picture, whereby motion vectors are decoded;

b) determining whether the decoded first field is structured as field picture or as frame picture;

c) if the decoded first field is determined to be structured as field picture, determining whether the first field of said reference picture or a nonexistent second field of the reference picture is to be referenced;

d) if the first field of said reference picture is determined to be referenced, performing a motion compensation by using the decoded motion vectors;

e) if the nonexistent second field of said reference picture is determined to be referenced, correcting the decoded motion vectors so that the corrected vectors extend from the first field of the reference picture to said decoded first field and performing a motion compensation by using the corrected motion vectors;

f) if the decoded first field is determined to be structured as frame picture, determining whether field estimation or frame estimation is to be used for motion compensation; and g) if the field estimation is determined to be used for motion compensation, repeating the instructions (d) and (e), and if the frame estimation is determined to be used, calculating average values of successive lines of the first field of said reference picture, correcting the decoded motion vectors by using the average values and performing a motion compensation by using the corrected motion vectors.

\* \* \* \* \*